United States Patent [19]

Shields et al.

[11] Patent Number: 5,210,628
[45] Date of Patent: May 11, 1993

[54] LIQUID CRYSTAL LIGHT VALVE WITH PHOTOSENSITIVE LAYER HAVING IRREGULAR DIODE PATTERN

[75] Inventors: Steven E. Shields, San Diego; Ogden J. Marsh, Carlsbad, both of Calif.

[73] Assignee: Hughes-JVC Technology Corporation, Carlsbad, Calif.

[21] Appl. No.: 780,177

[22] Filed: Oct. 21, 1991

[51] Int. Cl.⁵ .................. G02F 1/1343; G02F 1/135; G02F 1/1333
[52] U.S. Cl. ........................ 359/72; 359/60; 359/79
[58] Field of Search ............... 359/72, 79, 60

[56] References Cited

U.S. PATENT DOCUMENTS

| | | | |
|---|---|---|---|
| 4,032,954 | 6/1977 | Grinberg et al. | 359/72 |
| 4,093,357 | 6/1978 | Jacobson et al. | 359/72 |
| 4,127,322 | 11/1978 | Jacobson et al. | 353/31 |
| 4,150,876 | 4/1979 | Yevick | 359/72 |
| 4,191,456 | 3/1980 | Hong et al. | 353/31 |
| 4,228,449 | 10/1980 | Braatz | 359/72 |
| 4,343,535 | 8/1982 | Bleha, Jr. | 350/342 |
| 4,443,064 | 4/1984 | Grinberg et al. | 359/72 |
| 4,650,286 | 3/1987 | Koda et al. | 350/331 R |
| 4,826,300 | 5/1989 | Efron et al. | 359/72 |
| 4,842,376 | 6/1989 | Braatz et al. | 350/342 |
| 4,881,110 | 11/1989 | Braatz et al. | 357/30 |
| 4,913,531 | 4/1990 | Efron et al. | 359/72 |
| 4,925,276 | 5/1990 | McMurray et al. | 359/72 |
| 4,941,735 | 7/1990 | Moddel et al. | 359/72 |
| 5,073,010 | 12/1991 | Johnson et al. | 359/72 |
| 5,076,670 | 12/1991 | Sayyah | 359/72 |

FOREIGN PATENT DOCUMENTS

| | | | |
|---|---|---|---|
| 0002836 | 1/1991 | Japan | 359/72 |
| 8902613 | 3/1989 | World Int. Prop. O. | 359/72 |

Primary Examiner—William L. Sikes
Assistant Examiner—Anita Pellman Gross
Attorney, Agent, or Firm—Terje Gudmestad; Wanda K. Denson-Low

[57] ABSTRACT

A photosensitive layer of a liquid crystal light valve is made of a single crystal silicon wafer (14,70) bearing an irregular pattern of diodes (50a,50b, 60a,60b). The diodes are varied in size, shape and location so as to improve resolution, reduce interaction between the diode spatial pattern and the spatial pattern of input data, and, in one embodiment, to eliminate a difficult masking step. A masking step is eliminated by co-depositing a metal vapor and a silicon dioxide vapor to form random islands of cermets (50a,50b), each comprising an island of metal surrounded by a body of silicon dioxide. In other embodiments a pseudo-random mask is employed having an irregular pattern of holes (76) of varied sizes and locations. The mask is employed to photolithographically form an irregular pattern of holes in a silicon dioxide layer (72) laid down over the single crystal silicon (70) and a layer of metal (78) is deposited to provide areas of metal within the irregular pattern of holes in contact with the single crystal silicon layer. Alternatively, the mask with irregular holes may be employed to control areas in which an N-type ion dopant is implanted in a P-type silicon crystal.

43 Claims, 2 Drawing Sheets

LIQUID CRYSTAL LIGHT VALVE WITH PHOTOSENSITIVE LAYER HAVING IRREGULAR DIODE PATTERN

BACKGROUND OF THE INVENTION

1. Field of the Invention

This invention relates to reflective liquid crystal light valve systems, and more particularly concerns improvements in the photosensitive layer of a liquid crystal light valve.

2. Description of Related Art

The liquid crystal light valve (LCLV) is a thin film multi-layer structure comprising a liquid crystal layer, a dielectric mirror, a light blocking layer, and a photosensitive layer, all sandwiched between two transparent electrodes. In a typical reflective LCLV projection system a high intensity polarized projection beam is directed through the liquid crystal layer to the dielectric mirror. An input image of low intensity light, such as that generated by a cathode ray tube, is applied to the photosensitive layer, thereby switching the electric field across the electrodes from the photosensitive layer onto the liquid crystal layer. This field selectively activates the liquid crystal according to the intensity of input light received at different small areas or pixels of the photosensitive layer. Linearly polarized projection light from a high power light source, such as a xenon arc lamp, passes through the liquid crystal layer and is reflected from the dielectric mirror. Light reflected from the mirror is polarization modulated by the liquid crystal in accordance with the light information incident on the photosensitive layer. Therefore, if a complex distribution of light, for example a high resolution input image from a cathode ray tube, is focused onto the photosensitive layer, the liquid crystal light valve converts the low intensity input image into a replica image which can be reflected for projection with magnification to produce a high brightness image on a larger viewing screen. Projection systems of this type are described in several U.S. Pat. Nos., including U.S. Pat. No. 4,650,286 to Koda, et al for Liquid Crystal Light Valve Color Projector; 4,343,535 to Bleha, Jr. for Liquid Crystal Light Valve; 4,127,322 to Jacobson, et al for High Brightness Full Color Image Light Valve Projection system; and 4,191,456 to Hong, et al for Optical Block For High Brightness Full Color Video Projection System.

Resolution, image clarity and other parameters of the projected image of the liquid crystal light valve projection system depend to a high degree on the nature and operation of the photosensitive layer. The photosensitive layer may be made of cadmium sulfide, amorphous silicon, or single crystal silicon. In the case of single-crystal silicon light valves the prior art includes a regular array of very small diodes which effectively isolate the individual pixels of the input image from one another. In one form of photosensitive layer a plurality of diodes in a regular pattern are formed on a silicon substrate in potential wells associated with each of the closely spaced diodes. Each diode corresponds to an individual pixel or image area and, in some of the prior art devices, each may be a square of about 18 microns on each side, with each of the squares of the regular diode pattern being separated from adjacent squares by a gap of 2 to 3 microns. As the photosensitive layer experiences the AC bias that is applied to the electrodes of the LCLV, the silicon layer below each diode is alternately driven into depletion and into accumulation. In depletion mode, photogenerated charges caused by the input image are swept through the body of the material to the diode array. The purpose of the diode array is to localize passage of the charge at the surface of the photosensitive layer, and to limit motion of such charge laterally along the surface, thereby maintaining the resolution provided by the diode pattern. The resulting spatially varying impedance pattern at the photosensitive layer produces a corresponding increase in voltage dropped across the liquid crystal layer in a spatially varying pattern that matches the input image. This produces a corresponding two dimensional birefringence pattern in the liquid crystal material, having a magnitude that follows the input image. Birefringence is read out with a standard polarizing biprism to allow projection of the output image by means of the high intensity reading light.

Resolution of such a photosensitive layer is dependent upon the size of the individual diodes. Therefore, resolution no better than that allowed by the smallest diode size can be achieved.

Further, the regularity of the pattern of diodes tends to cause certain input image types to produce artificial artifacts in the displayed image. These artifacts are caused by interactions between the structure inside the LCLV and the input information. For example, if the input image should contain elements having a spatial repetition rate that is the same as or close to the spatial repetition rate of the diodes of the photosensitive layer, a pattern of alternate light and dark areas or a type of banding effect may be produced in the projected image. As a rough example of this effect, consider a series of parallel closely spaced slits in a mask which receives a pattern of light having similar parallel alternate strips of light and dark but in which the spacing of the light bands is somewhat different than that of the mask slits. At certain points the light areas or strips of the incoming information are aligned with the slits in the mask, whereas at other points the light areas or strips of the input image are blocked by the space between mask slits. This effect repeats at relatively low spatial frequency, resulting in a banding artifact in the image of light that passes through the slit mask. Similarly, if the input image of the liquid crystal light valve should have components that have a spatial pattern or spatial frequency analogous to the regular spatial pattern and spatial frequency of the diode array, artificial artifacts will be provided. In other words, the regular pattern of diodes in the photosensitive layer may produce information in the output display that is not in the original image but is solely the result of interaction between information contained in the image and information superimposed by the pattern of the diode array.

An additional problem with present arrangements for manufacture of photosensitive layers for the LCLV involves the requirement for use of complex masking steps for forming the diode array. These steps demand increased handling operations, more capital equipment and potential contamination of substrates by materials used in the photolithography process.

Accordingly, it is an object of the present invention to provide a liquid crystal light valve that avoids or minimizes above mentioned problems.

SUMMARY OF THE INVENTION

In carrying out principles of the present invention in accordance with a preferred embodiment thereof, a liquid crystal light valve includes a pair of transparent conductive electrodes, a mirror layer and a photosensitive layer having an irregular pattern of diodes formed thereon. All layers are sandwiched together between a pair of transparent conductive electrodes. According to one feature of the invention, a random pattern of diodes is formed on a single crystal silicon wafer without any masking steps by co-depositing vapors of a metal and an insulator. According to another feature of the invention, a layer of silicon dioxide is laid down upon a single crystal silicon substrate and, via photolithographic processes, is formed with an irregular pattern of holes to expose an irregular or pseudo-random pattern of small areas of the single crystal silicon substrate. A metal is then deposited upon the silicon dioxide and into the holes therethrough to contact the substrate throughout the irregular pattern of holes, thereby providing an irregular array of diodes.

DETAILED DESCRIPTION OF THE PREFERRED EMBODIMENT

Figure 1:
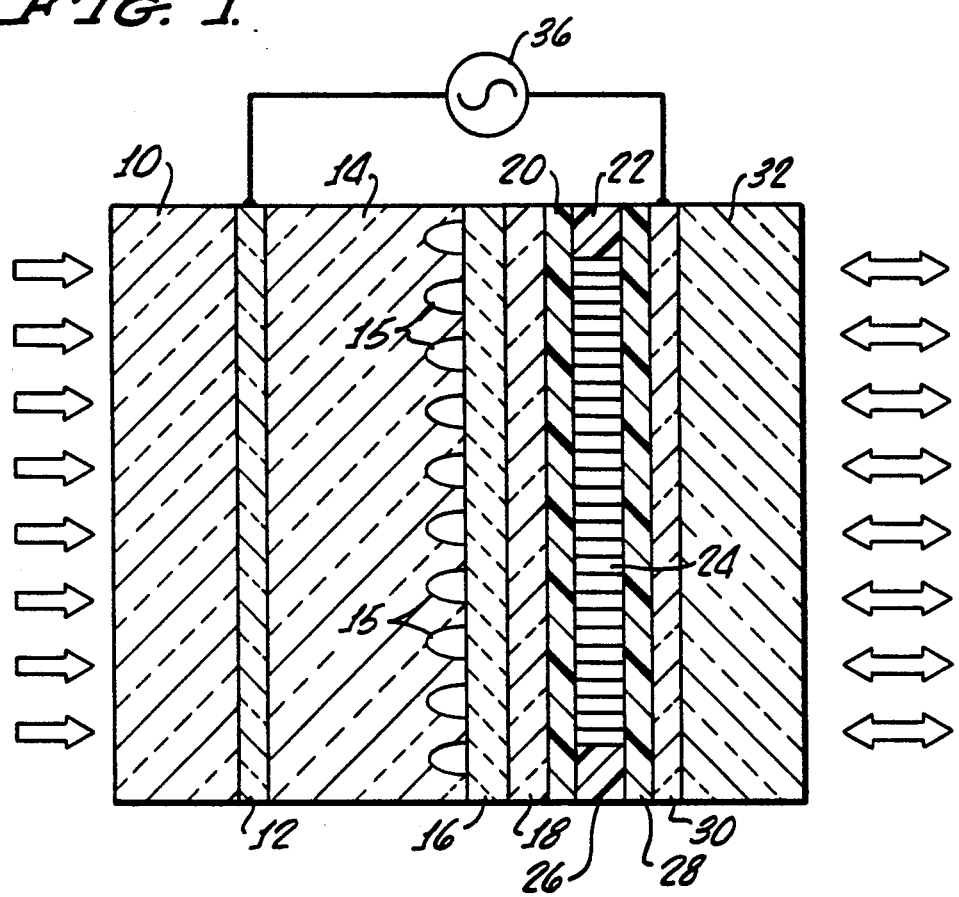
FIG. 1 is a cross sectional schematic of a liquid crystal light valve.

Illustrated in FIG. 1 for purposes of exposition is a schematic cross section of a typical silicon liquid crystal light valve (LCLV). It is to be noted that the invention described herein may be applied to liquid crystal devices having various types of photosensitive layers, but is more particularly useful and has been initially designed for use with a photosensitive layer formed of a single crystal silicon. The LCLV is a multi-layer structure composed of a stack of dielectric materials of varying resistivities and thicknesses. From left to right the typical cross section illustrated in FIG. 1 includes an input structure 10 which may be a fiber optic plate for direct coupling to the fiber optic face plate of a cathode ray tube (not shown), for example, a transparent conductive primary electrode 12 of indium tin oxide, for example, and a photosensitive layer 14, preferably formed of a single crystal silicon with a pattern of diodes thereon, as will be more particularly explained below. Electrode 12 may be made by doping the single crystal silicon substrate by ion implantation or other techniques well known to those skilled in the art. In FIG. 1 elements 15 of layer 14 are representative of the pattern of diodes formed on the single crystal silicon photosensitive layer 14. It will be understood, of course, that the diodes in FIG. 1 are shown very much enlarged in that typically each diode, as in a regular diode array of the prior art, is of roughly square configuration of about 18 microns on each side, with a space of 2 to 3 microns between adjacent diodes.

Continuing the description of the schematic cross section of FIG. 1, a light absorbing layer 16 (typically of cadmium telluride) is positioned adjacent the diode array of the -photosensitive layer and itself is positioned adjacent a dielectric mirror 18 formed in one embodiment of alternating layers of silicon dioxide and titanium dioxide. In succession the next layers comprise a first liquid crystal alignment film 20 (of silicon dioxide, for example), a liquid crystal material 22 confined between peripheral spacer pads 24, 26, a second liquid crystal alignment film 28 (again, for example, of silicon dioxide), a transparent conductive counter-electrode 30, and an output quartz window 32. Bonding layers (not shown) of cadmium telluride and silicon dioxide are provided between layers 14 and 16 and between layers 16 and 18 for proper adherence of these layers. Typical thicknesses of the materials in an exemplary LCLV are as follows: the silicon photosensitive layer, 125 micrometers; the cadmium telluride blocking layer, 2.2 micrometers; the dielectric mirror, 2 micrometers; the liquid crystal layer, 4 micrometers; and each silicon dioxide alignment film, 0.3 micrometers.

The light valve is provided with an audio frequency voltage signal from a source 36 connected to the primary and counter-electrodes 12 and 30, which establishes an alternating current across the multi-layer structure. This voltage is typically adjusted to the voltage at which the liquid crystal layer is at its threshold. The optically addressed light valve is provided with a varying optical input of relatively low intensity in the form of writing light from the fiber optic face plate 10 via a cathode ray tube (not shown). The writing light is applied through the transparent conductive primary electrode 12 to the photosensitive layer 14, which generates a pattern of DC voltages according to the pattern of the intensity of light received at different areas thereof. This reduces the AC impedance of the layer, causing an increase in the AC voltage dropped on the liquid crystal layer. With application of the voltage from the photosensitive layer, the audio frequency induced voltage is augmented, and a voltage above its threshold is applied to the liquid crystal, which changes orientation of its molecules. This writing light induced orientation causes changes of the polarization state of reading light passing through and reflected from the liquid crystal layer, to be changed at different areas according to the spatial pattern of voltage produced by the photosensitive layer. A high intensity polarized reading light is applied through quartz window 32, through the liquid crystal layer, to be reflected from dielectric mirror 18 back through the liquid crystal to produce an output optical image with a polarization pattern determined by the polarization state of the different areas or pixels of the liquid crystal layer. Thus a high intensity optical image of the writing light pattern is produced for display.

Figure 2:
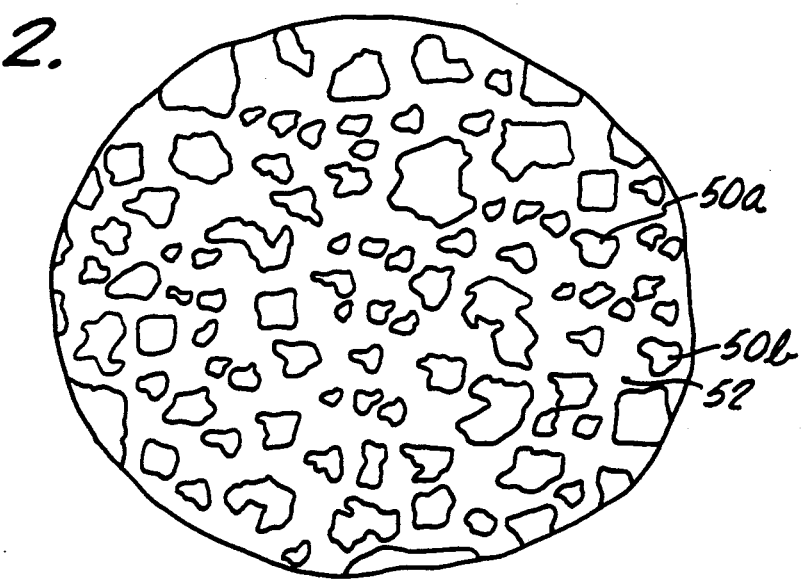
FIG. 2 is a greatly enlarged view of a portion of the surface of the photosensitive layer showing a random pattern of Schottky diodes.

According to a first embodiment of the present invention, an improved photosensitive layer is provided having a random pattern of Schottky diodes formed thereon. The diodes are formed without use of any diode mask at all. In this first embodiment a substrate is formed of a lightly doped N-type single crystal silicon, such as is produced according to teachings of U.S. Pat. Nos. 4,842,376 and 4,881,110, both entitled Double-Schottky Diode Liquid Crystal Light Valve, both invented by Paul O. Braatz and Uzi Efron, and both assigned to the assignee of the present invention. This single crystal silicon substrate is exposed to a vapor having a mixture of both metal and insulator material vapors. In a particular embodiment the metal vapor is a platinum vapor, and the insulator vapor is a silicon dioxide vapor. This vapor exposure of the single crystal silicon wafer, which has a thickness in the order of about 5 to 10 mils for example, results in the formation of a cermet. The cermet is composed of small discrete metal bodies that are isolated into islands (e.g. surrounded) by the insulator material. This produces randomly distributed small metal islands in an arrangement that is schematically depicted by the very much enlarged view of FIG. 2. Thus small irregular bodies of metal, such as those indicated at 50a and 50b for example, are deposited. These bodies have random size, random shape and random locations, but each is separated from the others by the co-deposited insulator material, generally indicated at 52 in FIG. 2. The metal-to-silicon interfaces form Schottky diodes. The resulting structure is a random distribution of small areas of metal which contact the single crystal silicon to comprise the randomly sized, shaped and distributed Schottky diodes of this improved single crystal silicon photosensitive array.

The resulting structure offers many advantages. First, the isolated diodes are obtained without using a masking step, as required by the prior art. In fact, it is possible, using this approach, to build a single crystal silicon LCLV without any masking steps at all. This results in a process with fewer handling operations, less capital equipment and no potential contamination of substrates by photolithographic chemicals, such as photoresist and the like.

An additional advantage of the described procedure is improved resolution of the light valve. This is so because the random formation of metal islands results in islands of metal that are smaller than the diodes formed by conventional masking procedures. In addition, the modulation transfer function (MTF) at the limiting resolution is determined by the smallest islands, not by the size of the features on a mask, such as used in the prior art. The modulation transfer function is a measure of the input modulation (contrast between light and dark areas of the input or writing light), as compared to the output modulation (contrast between corresponding light and dark areas of the output image). Thus a higher MTF is achieved with the smaller size diodes.

Still other improvements result from this co-depositing of vapors of metal and insulator. The random pattern of varied sizes, shapes and locations of the Schottky diodes formed by the interface between the islands of metal and the single crystal silicon substrate also minimize potential interaction between displayed information and the feature size of the diodes. Random irregularity of the diode pattern minimizes and almost completely avoids the likelihood that there would be a similarity of pattern between elements of an incoming light image and the random diode pattern. Thus artificial artifacts are avoided.

Figure 3:
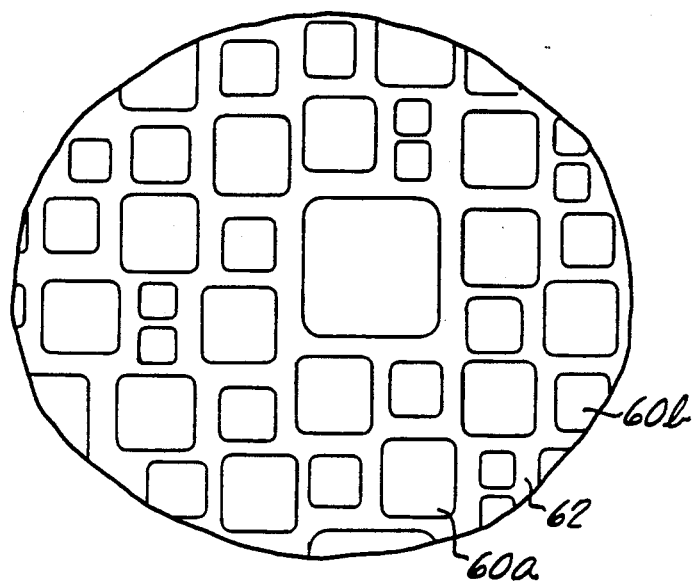
FIG. 3 is a greatly enlarged view of a portion of a photosensitive layer of a different embodiment showing a pseudo-random pattern of Schottky diodes having varying size and location.

As mentioned above, important features and improvements directly result from the random pattern of diode size, shape and location. To obtain such a diversity of size, shape and location, while concomitantly ensuring that an average size of the metal islands is more closely controlled, a slightly different process may be employed. In this second embodiment of the invention, Schottky diodes are formed in a pseudo-random pattern of the type illustrated in FIG. 3. FIG. 3 shows, greatly enlarged, a small section of a plurality of such a pseudo-random diode array, including diodes generally indicated at 60a and 60b. Schottky diodes are formed by areas of metal indicated at 60a and 60b in contact with the underlying single crystal silicon and which are separated by an insulator, generally indicated at 62. In the formation of the pseudo-random pattern of FIG. 3, a masking step is required, but nevertheless the above described advantages of the irregular pattern still are obtained. The pseudo-random array of FIG. 3 is manufactured by a sequential process, of which certain steps are illustrated in FIGS. 4, 5 and 6.

Figure 4:
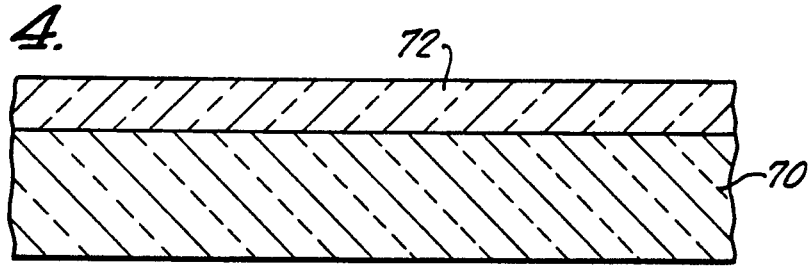
FIGS. 4 through 6 illustrate certain steps in the manufacture of an irregular pattern of Schottky diodes employing a mask having an irregular pattern of apertures therein.
Figure 5:
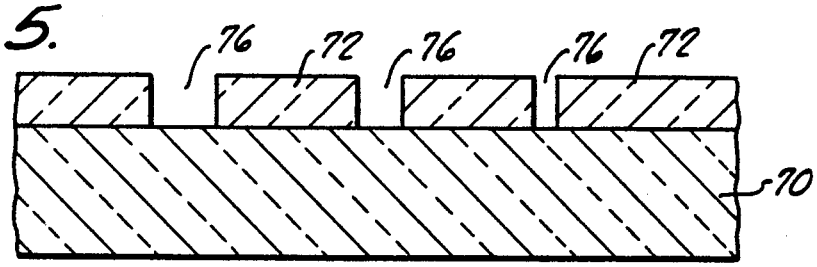

A substrate formed of a lightly doped N-type single crystal silicon wafer 70 has formed thereon a layer of silicon dioxide 72, as shown in FIG. 4. Thereafter, as shown in FIG. 5, conventional photolithographic processes are employed to form a pseudo-random pattern of holes, generally indicated at 76, which extend through the silicon dioxide layer to expose the underlying single crystal silicon substrate 70. Holes 76 in the silicon dioxide are made by forming a mask (not shown) having a pseudo-random pattern of holes therethrough and placing such a mask on the surface of the silicon dioxide. The pseudo-random pattern of holes in the mask is substantially identical to the pattern illustrated in FIG. 3, which also is the pattern of the resulting irregular array of diodes. With the mask covering the silicon dioxide layer 72, the latter is subjected to an etchant, which removes the silicon dioxide from the areas of the holes in the mask. Thereafter the mask is removed, yielding the sub-assembly of FIG. 5.

Figure 6:
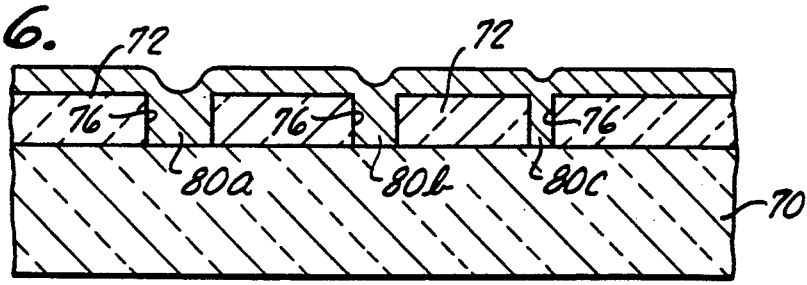

Then, as illustrated in FIG. 6, the single crystal silicon, with its layer of silicon dioxide having the irregular pattern of holes, is covered with a metal, such as platinum, by, for example, exposing the surface to a platinum vapor. The platinum covers the silicon dioxide and enters the holes of the random pattern of holes, contacting the single crystal silicon in each of the holes. This metal-to-silicon contact provides Schottky type metal to silicon diode interfaces and, therefore, the desired pseudo-random pattern of diodes. FIG. 6 shows the resulting layer of metal 78 covering the silicon dioxide 72 and single crystal layer 70. Metal portions indicated at 80a, 80b and 80c, fill the irregular pattern of holes in the silicon dioxide and contact the single crystal silicon substrate in the pseudo-random pattern.

Although the arrangement illustrated in FIGS. 3 through 6 does not have the advantage of eliminating a masking step, it nevertheless does provide significant improvement over previous devices by providing an irregular pattern of diodes that essentially eliminates the production of artifacts in the displayed image, improves resolution, and improves modulation transfer function.

In a manner analogous to the irregular masking arrangement for providing an irregular pattern of Schottky diodes, as described in connection with FIGS. 3 through 6, an ion implantation method of creating an irregular pattern of diodes on the single silicon substrate may be employed as still another alternative. For implantation of a pseudo-random pattern of diodes, a single crystal P-type silicon wafer is covered with a mask having an irregular pattern, which may be the pattern illustrated in FIG. 3. The mask is applied directly to the surface of the single crystal silicon and then exposed to an ion implantation of suitable N-type ions, such as phosphorous ions, for example. The phosphorous ion implantation in the P-type single crystal silicon thus provides a pseudo-random array of diodes of pseudo-random size and location, which achieves the advantages of such an irregular pattern, as described above.

What is claimed is:

1. A liquid crystal light valve comprising:
   a layered assembly including:
     a pair of transparent conductive electrodes,
     a liquid crystal layer,
     a mirror layer, and
     a photosensitive layer having an irregular pattern of diodes formed thereon,
     said liquid crystal, mirror and photosensitive layers all being sandwiched together between said transparent conductive electrodes.

2. The device of claim 1 wherein said diodes have random sizes.

3. The device of claim 1 wherein said diodes have random shapes.

4. The device of claim 1 wherein said diodes comprise an array of cermets formed of a metal and an 5. The device of claim 1 wherein said photosensitive layer comprises a single crystal layer of silicon and wherein said diodes comprise a pattern of Schottky diodes of irregular size and location.

6. The device of claim 1 wherein said photosensitive layer comprises a single crystal layer of silicon having a silicon dioxide coating, said coating having a pseudo-random pattern of holes therein, said diodes comprising a metal in said holes and in contact with said single crystal silicon.

7. The device of claim 1 wherein said diodes comprise an array of cermets formed of platinum and silicon dioxide.

8. The device of claim 1 wherein said diodes comprise an array of diodes of pseudo-random size.

9. The device of claim wherein said diodes comprise an array of diodes of varied shapes and spacing.

10. The device of claim wherein said diodes comprise an array of diodes of generally rectangular configuration and of mutually different sizes.

11. The device of claim 1 wherein said photosensitive layer comprises a single crystal silicon and said diodes are implanted in a pseudo-random array.

12. A liquid crystal light valve comprising: successive layers of:
   a transparent conductive electrode,
   a photosensitive layer comprising an array of diodes of mutually different configuration,
   a light blocking layer,
   a dielectric mirror,
   a first alignment film,
   a liquid crystal layer,
   a second alignment film, and
   a counter electrode.

13. The device of claim 12 wherein said array includes diodes of mutually different shapes.

14. The device of claim 12 wherein said array includes diodes of mutually different sizes and shapes.

15. The device of claim 12 wherein said array includes diodes of pseudo-random sizes.

16. The device of claim 12 wherein said array comprises a pattern of diodes of random size and shape.

17. The device of claim 12 wherein said array comprises diodes having a metal to dielectric interface.

18. The device of claim 12 wherein said photosensitive layer comprises a layer of single crystal silicon having an irregular pattern of discrete areas of metal in contact therewith and forming said array of diodes.

19. The device of claim 12 wherein the diodes are cermets.

20. The device of claim 17 wherein the metal is platinum.

21. The device of claim 12 wherein said diodes are cermets of co-deposited metal and silicon dioxide.

22. The device of claim 12 wherein said diodes comprise cermets of random size and shape.

23. A method of making a liquid crystal light valve comprising the steps of:
   providing a dielectric substrate,
   forming on said substrate an array of diodes of mutually different sizes, and
   assembling said substrate with layers of electrode layers, a light blocking layer, a mirror layer and a liquid crystal layer.

24. The method of claim 23 wherein said step of forming comprises forming an array of diodes of mutually different shapes.

25. The method of claim 23 wherein said step of forming comprises forming a random pattern of diodes of different sizes, shapes and locations.

26. The method of claim 23 wherein said step of forming comprises forming a pseudo-random pattern of diodes of different sizes and locations.

27. The method of claim 23 wherein said step of forming comprises forming an array of cermets.

28. The method of claim 23 wherein said step of forming comprises forming a plurality of diodes having a metal to dielectric interface.

29. The method of claim 23 wherein said step of forming comprises co-depositing a metal and a dioxide on said substrate.

30. The method of claim 23 wherein said step of forming comprises exposing said substrate to a vapor containing both a metal and silicon dioxide.

31. The method of claim 23 wherein said substrate is an N- type silicon and wherein said step of forming comprises forming on said substrate an array of Schottky diodes.

32. The method of claim 23 wherein said step of forming comprises providing a mask having a pseudo-random pattern of apertures, and employing said pattern of apertures to form said diodes.

33. The method of claim 23 wherein said substrate comprises a single crystal silicon, and wherein said step of forming comprises coating said substrate with silicon dioxide, forming a pseudo-random pattern of holes in said silicon dioxide, and placing a metal in said holes in contact with said single crystal silicon.

34. The method of claim 23 wherein said step of forming comprises placing on said substrate a mask having a pseudo-random pattern of apertures of mutually different sizes, and forming on said substrate said array of diodes having the pseudo-random pattern of said mask.

35. A method of making a photosensitive layer of a liquid crystal light valve comprising the steps of:
   providing a doped silicon substate, and
   simultaneously depositing metallic and insulator material on said substrate to form a pattern of cermets wherein deposited metal is isolated into discrete islands separated by the insulator material.

36. The method of claim 35 wherein said step of depositing comprises exposing said substrate to a vapor of metal and insulator material.

37. A method of making a photosensitive layer of a liquid crystal light valve comprising the steps of:
   providing a wafer formed of single crystal silicon, forming a layer of silicon dioxide on said wafer, and photolithographically forming in said layer of silicon dioxide a pseudo-random pattern of diodes having varying sizes and an irregular pattern of locations.

38. A method of making a photosensitive layer of a liquid crystal light valve comprising the steps of:
providing a wafer formed of a single crystal silicon,
providing a mask having an irregular pattern of apertures of varying sizes and locations, and
employing said mask to form on said wafer an irregular array of diodes of varying sizes and locations.

39. The method of claim 38 wherein said step of employing said mask comprises positioning the mask upon said wafer and forming said diodes by implantation of ions through the apertures of said mask.

40. The method of claim 38 wherein said step of employing said mask comprises forming a layer of silicon dioxide on said wafer, employing said mask to form a pattern of holes extending through said layer of silicon dioxide, and depositing metal over said mask and into said holes in contact with said wafer in said holes.

41. A photosensitive layer for a liquid crystal light valve comprising:
a single crystal silicon wafer,
a dielectric coating on said wafer, said coating having an irregular pattern of holes extending therethrough to said wafer,
said holes containing a metal in contact with said wafer.

42. The photosensitive layer of claim 41 wherein said coating is silicon dioxide and including a metallic platinum coating covering said silicon dioxide and forming the metal contained in said holes.

43. A photosensitive layer for a liquid crystal light valve comprising:
a single crystal silicon wafer, and
a plurality of cermets on said wafer formed in an irregular pattern, said cermets comprising small discrete bodies of metal having random size and shape, each said body being surrounded by an insulator material.

* * * * *

UNITED STATES PATENT AND TRADEMARK OFFICE
CERTIFICATE OF CORRECTION

PATENT NO. : 5,210,628
DATED : May 11, 1993
INVENTOR(S) : Steven E. Shields & Ogden J. Marsh It is certified that error appears in the above-indentified patent and that said Letters Patent is hereby corrected as shown below:

Column 4, Line 6      change "-photosensitive" to -- photosensitive --.

Column 5, Line 15      change " such 35 as" to -- such as --.

Column 7, Line 20
Claim 4      change "and an" to -- and an oxide. --.

Column 8, Line 58,
Claim 35      change "substate" to --substrate--.

Signed and Sealed this

Sixteenth Day of May, 1995

Attest:

BRUCE LEHMAN

Attesting Officer      Commissioner of Patents and Trademarks